(No Model.)
C. H. HINDS.
ELECTRIC GAS LIGHTER.
No. 426,381. Patented Apr. 22, 1890.
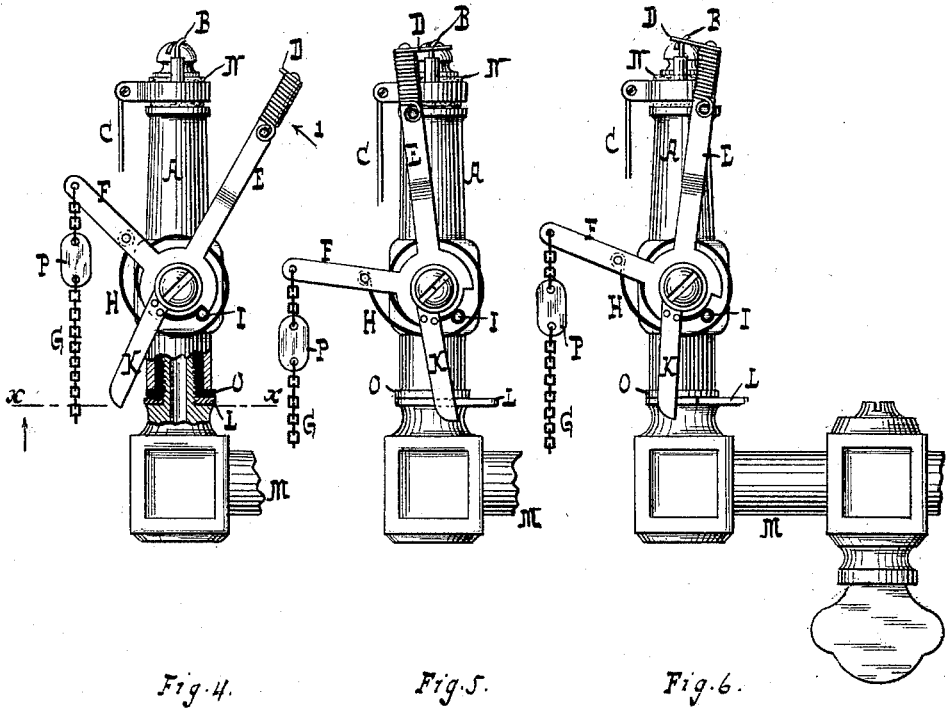
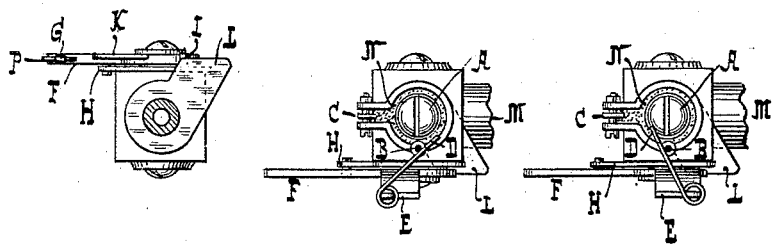
WITNESSES:
William Miller
Edward Wolff
INVENTOR:
Charles H Hinds.
BY
Van Santvoord & Hauff
ATTORNEYS

UNITED STATES PATENT OFFICE.

CHARLES H. HINDS, OF NEW YORK, N. Y.

ELECTRIC GAS-LIGHTER.

SPECIFICATION forming part of Letters Patent No. 426,381, dated April 22, 1890.

Application filed August 29, 1889. Serial No. 322,287. (No model.)

*To all whom it may concern:*

Be it known that I, CHARLES H. HINDS, a citizen of the United States, residing at New York, in the county and State of New York, have invented new and useful Improvements in Electric Lighters, of which the following is a specification.

This invention relates to an improvement in devices adapted to light gas by electricity, and by means of this invention waste of electricity and running down of the battery can be prevented, as set forth in the following specification and claims, and illustrated in the accompanying drawings, in which—

Figure 1 is a side elevation, partly in section, of a burner having a lighter. Fig. 2 is a view similar to Fig. 1, showing the lighter moving to the igniting position. Fig. 3 is a view similar to Fig. 2, showing the lighter returning to the starting position. Fig. 4 is a section along $x$ $x$, Fig. 1. Fig. 5 is a plan view of Fig. 2. Fig. 6 is a plan view of Fig. 3.

Similar letters indicate corresponding parts.

In the drawings, the letter A indicates a burner. Said burner has an electrode B, connected by a conductor C to a battery. The wiping electrode D is arranged in any suitable way to wipe against the electrode B and to break contact with said electrode B, thus producing a spark to light the jet from the burner. This electrode D is shown as consisting of the well-known spring-arm. As seen in the drawings, the bell-crank lever E F, when drawn by the chain or handle G in the direction of arrow 1, Fig. 1, will cause a wiping and subsequent separation of the electrodes and a consequent lighting-spark. A spring H returns the electrode D to its starting-point. A stop I limits the movement of electrode D. During the return movement of the electrode D said electrode again comes into temporary contact with electrode B, and if no provision is made to avoid a spark during said return movement of electrode D said return movement causes a waste of the battery, as said second spark is of no practical value, the jet having already been ignited by the first spark. To avoid such second spark I provide the electrode D with a temporary circuit-closer, which closes the circuit at the lighting position of the electrodes and leaves the circuit broken when the electrodes are out of the lighting position. The temporary circuit-closer is shown as consisting of an arm or contact-piece K, which, when the electrode D is about to move to the lighting position, Fig. 2, comes in contact with a suitable conductor L, placed in the path of said contact-piece K. Said conductor is secured to the pipe M, or other suitable conductor, so as to close the circuit either by grounding or any other well-known way. During the return movement of the electrode D said electrode again comes in contact with the electrode B, Fig. 3; but in this position of the electrodes the contact-piece K is out of connection with the conductor L, so that no circuit is made, and consequently the return movement of the electrode D does not produce a spark, and consequent waste of the battery is avoided.

The electrodes B D are insulated in any suitable way. The electrode B is insulated by an insulating-collar N. The electrode D can be readily insulated by means of an insulating-section O, Fig. 1, which insulates the part of the burner which supports the electrode D from the pipe M, thereby insulating the electrode D and compelling the circuit to be closed by the temporary circuit-closer K.

To prevent any circuit being formed through the handle or chain G, said handle or chain can be made of insulating material or provided with an insulating section or link P. To avoid breakage of parts the contact-piece K or conductor L may be made yielding or elastic. Spring metal can be advantageously employed for making the contact-piece or conductor yielding, so that a firm contact can be obtained at proper times between the contact-piece and the conductor without risk of breakage.

What I claim as new, and desire to secure by Letters Patent, is—

1. The combination, with a burner having an insulated electrode B and a conductor L, of a movable lever E, an electrode D, connected to said lever, and a contact-arm K, also connected to said lever and making contact with the conductor in that movement of the lever which moves the electrode D into contact with the electrode on the burner, substantially as described.

2. The combination, with a burner having an insulated electrode B and a conductor L, of a pivoted swinging lever E, carrying the electrode D, which swings in the arc of a circle with said lever, and a contact-arm K, also swinging in the arc of a circle with the lever and making contact with the conductor in the swinging movement of the lever to swing its electrode into contact with the electrode on the burner, substantially as and for the purposes described.

In testimony whereof I have hereunto set my hand in the presence of two subscribing witnesses.

CHAS. H. HINDS.

Witnesses:
W. C. HAUFF,
E. F. KASTENHUBER.